US007000013B2

United States Patent
Mei et al.

(10) Patent No.: US 7,000,013 B2
(45) Date of Patent: Feb. 14, 2006

(54) SYSTEM FOR PROVIDING GRACEFULLY DEGRADED SERVICES ON THE INTERNET UNDER OVERLOADED CONDITIONS RESPONSIVE TO HTTP COOKIES OF USER REQUESTS

(75) Inventors: Mark Gee-Gwo Mei, Yorktown Heights, NY (US); Kun-Lung Wu, Yorktown Heights, NY (US); Philip Shi-Lung Yu, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 591 days.

(21) Appl. No.: 09/861,820

(22) Filed: May 21, 2001

(65) Prior Publication Data

US 2002/0174219 A1 Nov. 21, 2002

(51) Int. Cl.
*G06F 15/173* (2006.01)
(52) U.S. Cl. ........................................ 709/223; 709/227
(58) Field of Classification Search ................ 709/227, 709/228, 229, 233, 234, 235, 200; 370/230, 370/252, 394, 231, 468
See application file for complete search history.

(56) References Cited

U.S. PATENT DOCUMENTS

| 6,157,618 | A * | 12/2000 | Boss et al. ................... 370/252 |
| 6,345,038 | B1 * | 2/2002 | Selinger ..................... 370/230 |
| 6,529,475 | B1 * | 3/2003 | Wan et al. ................... 370/231 |
| 6,687,732 | B1 * | 2/2004 | Bector et al. ............... 709/200 |
| 6,697,378 | B1 * | 2/2004 | Patel .......................... 370/468 |
| 6,781,991 | B1 * | 8/2004 | Anderlind ................... 370/394 |
| 2002/0019873 | A1 * | 2/2002 | Goldszmidt et al. ........ 709/228 |

* cited by examiner

*Primary Examiner*—Le Hien Luu
(74) *Attorney, Agent, or Firm*—Rafaell Perez-Pineiro; Harrington & Smith, LLP

(57) ABSTRACT

An arrangement for providing gracefully degraded services on the Internet under overloaded conditions, involving tagging user request to indicate the status of said request and providing appropriate level of degraded services gracefully responsive to said tagging information.

15 Claims, 6 Drawing Sheets

SYSTEM FOR PROVIDING GRACEFULLY DEGRADED SERVICES ON THE INTERNET UNDER OVERLOADED CONDITIONS RESPONSIVE TO HTTP COOKIES OF USER REQUESTS

CROSS-REFERENCE TO RELATED PATENT APPLICATIONS

This Patent Application is related to U.S. patent application Ser. No. 09/716,862, filed Nov. 20, 2000, now U.S. Pat. No. 6,859,020, entitled "Apparatus, System, and Method for Managing Quality-of-Service-Assured e-Business Service Systems," by J. K. Chaar and R. N. Chang. This Patent Application is also related to U.S. patent application Ser. No. 09/543,207, filed Apr. 5, 2000, now U.S. Pat. No. 6,859,025, entitled "Highly Scalable System and Method of Regulating Internet Traffic to Server Farm to Support (min, max) Bandwidth Usage-based Service Level Agreements, by Maruyama et al. This Patent Application is also related to U.S. patent application Ser. No. 09/644,915, filed Aug. 24, 2000, now U.S. Pat. No. 6,816,907, entitled "System and Method for Providing Differentiated Services on the Web," by Mei et al.

FIELD OF THE INVENTION

The present invention is generally related to the World Wide Web on the Internet. More specifically, it is related to a system and method for providing gracefully degraded services on the Internet under overloaded conditions. It allows a service provider, such as a content hoster or an Internet service provider, to provide various kinds of gracefully degraded services to the end users of content providers on the Web in the face of overloaded conditions.

BACKGROUND OF THE INVENTION

As more and more businesses are conducted via the Internet, customer experience on the Web has become critically important. In both business to consumer (B2C) and business to business (B2B) spaces, customer loyalty can easily be damaged if a Web site fails to provide satisfactory services in the form of fast response times. This is especially true during the period when the system is under overloaded conditions. With the global nature of the Web and the difficulty in predicting user demands, overloaded conditions are likely to occur quite frequently on the Internet. Hence, it is important to examine the way Web services are provided on the Internet under overloaded conditions.

Current practices in providing services on the Web under overloaded conditions are highly undesirable. Generally, users are either kept waiting for the system to return something or they are provided with a simple message indicating "server not found". In either case, not much useful information has been conveyed to the users, leaving them totally in the dark. Not knowing what happened, many of them might repeatedly hit the reload" button on their browsers. As a result, even more traffic will be generated, compounding an already overloaded condition. Under such circumstances, many users can be frustrated. Customer loyalty and business reputation can be severely damaged. Hence, a need is recognized for providing more satisfactory services on the Internet even in the face of overloaded conditions.

In the present invention, a system and method are disclosed to provide gracefully degraded services on the Internet under overloaded conditions. The phrase "gracefully responsive" is meant to indicate or signify the opposite of responding in a manner that is inhospitable or lacking in grace such as by total silence or, curtly, by "server not found", which are customary types of responses. Instead of keeping the users waiting or giving simple "server not found" messages, various kinds of gracefully degraded services can be immediately provided. For example, users of an overloaded Web site can receive a page with much more information in it. The system can provide a more responsive page that contains the following message: "Our servers are experiencing extremely high demands now, please come back in 5 minutes." This way the demands can be spread over a longer period of time, reducing the immediate system load. When the customers indeed return as suggested in a later time, the system will service them as promised. Understanding what is happening, most customers will be more willing to wait and come back at a later time. In the case of video or image pages, lower resolution contents can be delivered instead of the original high resolution ones. Hence, bandwidth usage can be reduced and more users can be served. In other words, lesser quality of services can still be provided even in the face of an overloaded condition.

In light of today's emerging Internet service infrastructure, the gracefully degraded services disclosed in the present invention can be implemented in one or more places on the Internet. Many of the content provider Web sites, both B2C and B2B, are usually hosted in a data center by a content hoster, such as IBM Global Services or Exodus Communications, Inc. The data centers of a content hoster are generally located on the core of the Internet. Web users, especially consumers and small businesses, are generally connected to the Internet via an Internet Service Provider (ISP), such as AOL or Earthlink Inc. The points of access of an ISP are generally located on the edge of the Internet. For both content hosters and ISPs, extra resources are typically reserved for handling future demand growth. Part of these extra resources can be used to provide gracefully degraded services. The gracefully degraded services disclosed in the present invention can be implemented by the content hosters or the ISPs.

There are advantages to various participants in providing gracefully degraded services on the Internet. For Web users, they will be less likely to become unhappy because they can receive more responsive services. For content providers, they can maintain their brand loyalty by offering gracefully degraded services to their customers. They can better handle unexpected demand spikes. Moreover, they can better deal with the demand mismatch caused by poor capacity planning. Inaccurate capacity planning happens, especially when a new service is first offered or a promotional campaign is started. Finally, for content hosters, they may charge content providers with premium prices for gracefully handling demand spikes or poor capacity planning. Content hosters can also maintain a certain service quality during the period when extra resources are dynamically added.

In the above-referenced commonly assigned US Patent Application by Chaar and Chang, U.S. Pat. No. 6,859,020, entitled "Apparatus, System, and Method for Managing Quality-of-Service-Assured e-Business Service Systems," a general Service Level Agreement (SLA) monitoring system was disclosed. An SLA is a legal document describing the service contract between a content provider and the content hoster. Their goal is to monitor and enforce SLAs. Certain actions, such as increasing resources, can be taken to fulfill the obligations bound by the SLAs. No specific system or method in Chaar and Change were disclosed to provide gracefully degraded services in the face of overloaded conditions, even though gracefully degraded services disclosed in the present invention can be signed into legal contracts between the content hoster and the content providers.

In the above-referenced commonly assigned US Patent Application by Maruyama et al, U.S. Pat. No. 6,859,025, entitled "Highly Scalable System and Method of Regulating Internet Traffic to Server Farm to Support (min,max) Bandwidth Usage-based Service Level Agreements," a method was disclosed to control the incoming traffic to a server farm so that the output of the server farm can meet the requirements of SLAs. Requests may be dropped in order to meet the SLA requirements. Although regulating incoming traffic can reduce potential overloaded conditions, no specific mechanism was disclosed by Maruyama et al to provide gracefully degraded services as disclosed in the present invention.

In the above-referenced commonly assigned US Patent Application by Mei et al, U.S. Pat. No. 6,816,907, entitled "System and Method for Providing Differentiated Services on the Web," a method to provide differentiated services on the Web in the form of faster response times to preferred customers of a Web site was disclosed. Priority tables were used to allocate resources to a subset of preferred customers so that their requests could be serviced with higher priorities. No specific system or method in Mei et al were disclosed to provide gracefully degraded services under overloaded conditions, even though the response page for degraded services disclosed in the present invention is handled immediately with a higher priority.

Thus, there is a need to have a system and method for providing gracefully degraded services on the Internet under overloaded conditions.

Accordingly, it is a primary object of this present invention to enable such degraded services to be available to the user when overloaded conditions arise.

SUMMARY OF THE INVENTION

In achieving the primary object stated above, the system and method of the present invention, briefly defined as follows: a method for providing gracefully degraded services on the Internet under overloaded conditions, comprising the steps of tagging user requests to indicate the status of said requests; providing appropriate level of degraded services gracefully responsive to said tagging information.

The foregoing and still further objects and advantages of the present invention will be more apparent from the following detailed explanation of the preferred embodiments of the invention in connection with the accompanying drawings.

DESCRIPTION OF THE PREFERRED EMBODIMENT

Figure 1:
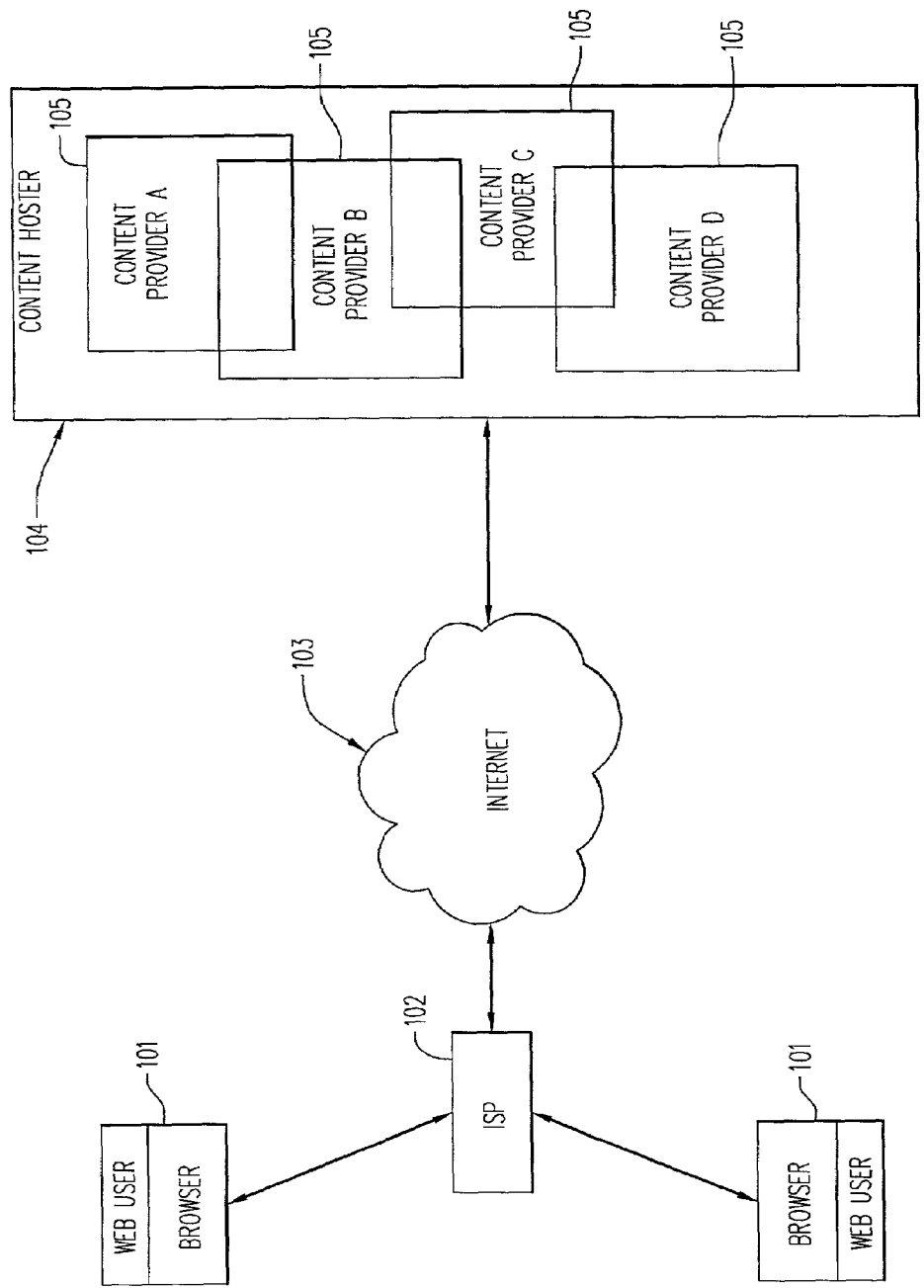
FIG. 1 is a system block diagram showing the prevailing Internet service infrastructure.

FIG. 1 is a system block diagram showing the prevailing Internet service infrastructure. A plurality of Web users typically access the Internet contents via a browser 101, which is a software program capable of displaying information on an electronic display. The browser is usually running on an electronic device, such as a personal computer, a workstation, a personal digital assistant (PDA) or a cellphone. The electronic devices are connected to an Internet Service Provider (ISP) 102 via a wired line or wireless communication link. With a pool of computer and communication servers, an ISP accepts connections from a plurality of Web users. Generally, an ISP has a plurality of points of access at different geographical locations at the edge of the network. Once connected, the Web users can access the contents offered by the content providers, such as CNN.com or yahoo.com. A plurality of content providers 105 whose Web sites are hosted physically by a content hoster 104 in one or more data centers. The content hoster usually employs a pool of resources, such as servers, disks, switches, routers, and high speed communication links to the Internet. These resources are typically located at one or more data centers and are shared by the content providers. The gracefully degraded services disclosed in the present invention are preferably implemented by a content hoster at the data centers. However, they can also be implemented by an ISP at the edge of the network.

Figure 2:
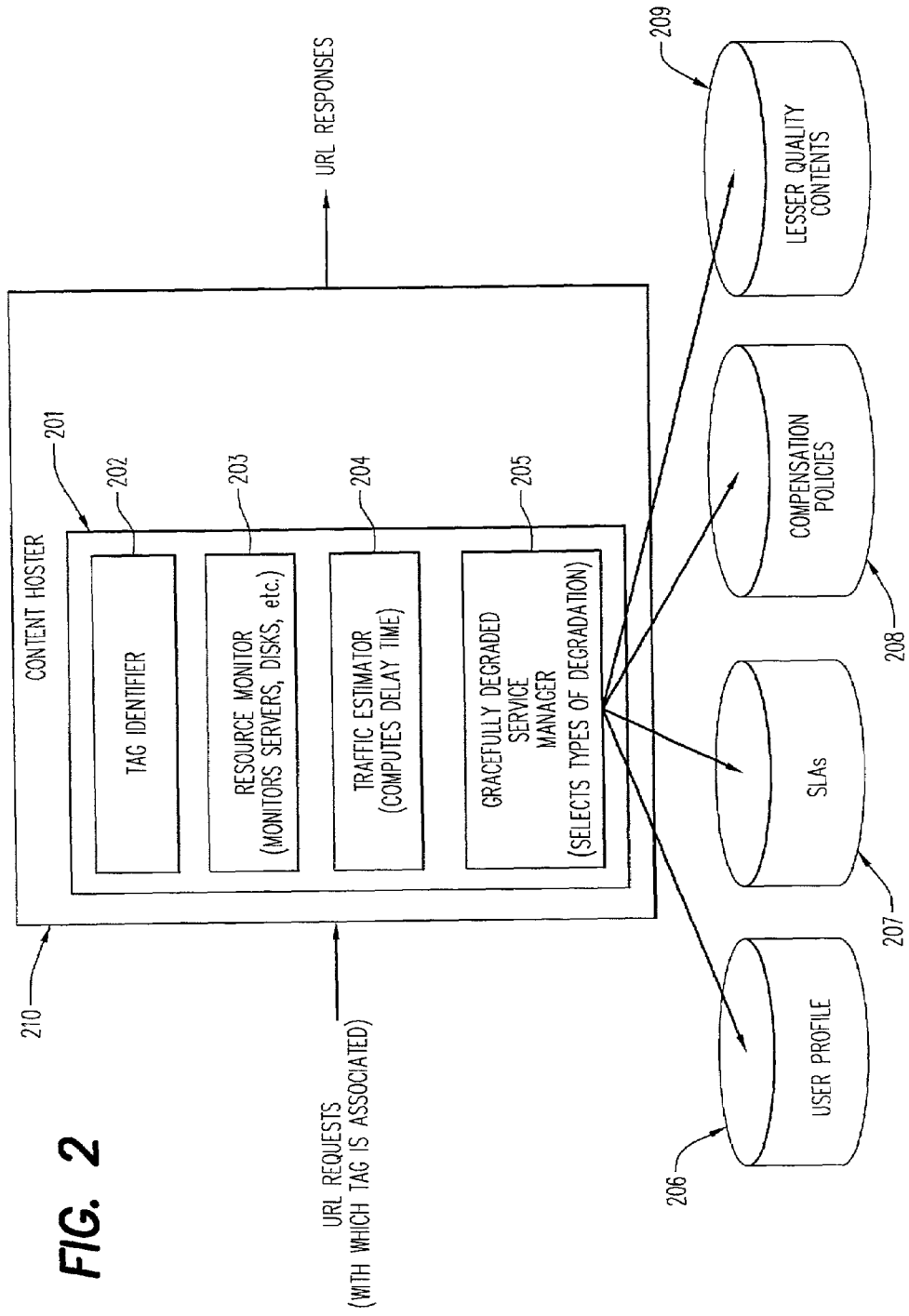
FIG. 2 is a block diagram which shows the important modules and databases that are used to implement the gracefully degraded services disclosed in the present invention.

FIG. 2 is a block diagram which shows, within a data center of a content hoster 210, the important modules and databases that are used to implement the gracefully degraded services disclosed in the present invention. To provide gracefully degraded services under overloaded conditions, the solution logic 201 contains four general modules. They are a tag identifier 202, a resource monitor 203, a traffic estimator 204 and the gracefully degraded service manager 205 (see FIG. 3 for more details). These modules are software programs and can be run on one or more servers within the data center of a content hoster 210. URL requests from Web users 101 (FIG. 1) are processed by these modules and responses are then returned. In order to carry out appropriate gracefully degraded services, certain databases are used, including user profile 206, SLAs 207, compensation policies 208, and lesser quality contents 209. These databases are used mainly by the degraded service manager 205 in determining the proper levels of degraded services to provide by the content hoster. Details of their usage will be described in connection with FIG. 3.

The tag identifier 202 in FIG. 2 is a software module which examines the tag that is associated with each URL request. Such a tag is usually stored in the header fields of an URL request, such as those known as "cookies", which are messages carried in the header of an HTTP request. Various kinds of information can be embedded or encoded in a tag. The tag identifier can directly interpret the meaning of it. Alternatively, the tag identifier can indirectly look up its meaning from a database. One use of the tag is for the service manager 205 to determine which kind of degraded services to provide. Another use of the tag is for the service manager 205 to determine if this URL request is a first time customer or a repeat customer who has already experienced a degraded service. The tags in the form of "cookies" will be stored by the browser software in the user's electronic device and will be sent back to the content provider Web sites on a subsequent request.

The resource monitor 203 in FIG. 2 is a software module that monitors the usage of various resources, including servers, disks and communication links. It generates various resource utilization statistics that are available to the traffic estimator 204 and the service manager 205. The service manager uses the statistics to determine if a request to a Web site will cause an overloaded condition for a content provider based on the current SLA. Those skilled in the art will appreciate that an overloaded condition can occur at a content provider Web site but not at others, even though they are all hosted by the same content hoster and there are still available resources. This is due to the fact that most of the content hosting services are defined and bound by an SLA. Unexpected user demands, due to special events or poor capacity planning, can easily consume the allocated resources of a content provider based on the signed SLA. When such conditions are detected, the service manager 205 can then take necessary actions to deal with them. For example, gracefully degraded services can be provided.

The traffic estimator 204 in FIG. 2 is a software module that estimate and predict traffic patterns based on the traffic statistics data generated by the resource monitor 203. Under an overloaded condition, the traffic estimator 204 computes a delay time period, which the service manager 205 may use to offer a Web customer in delayed services (more details in FIG. 3).

Figure 3:
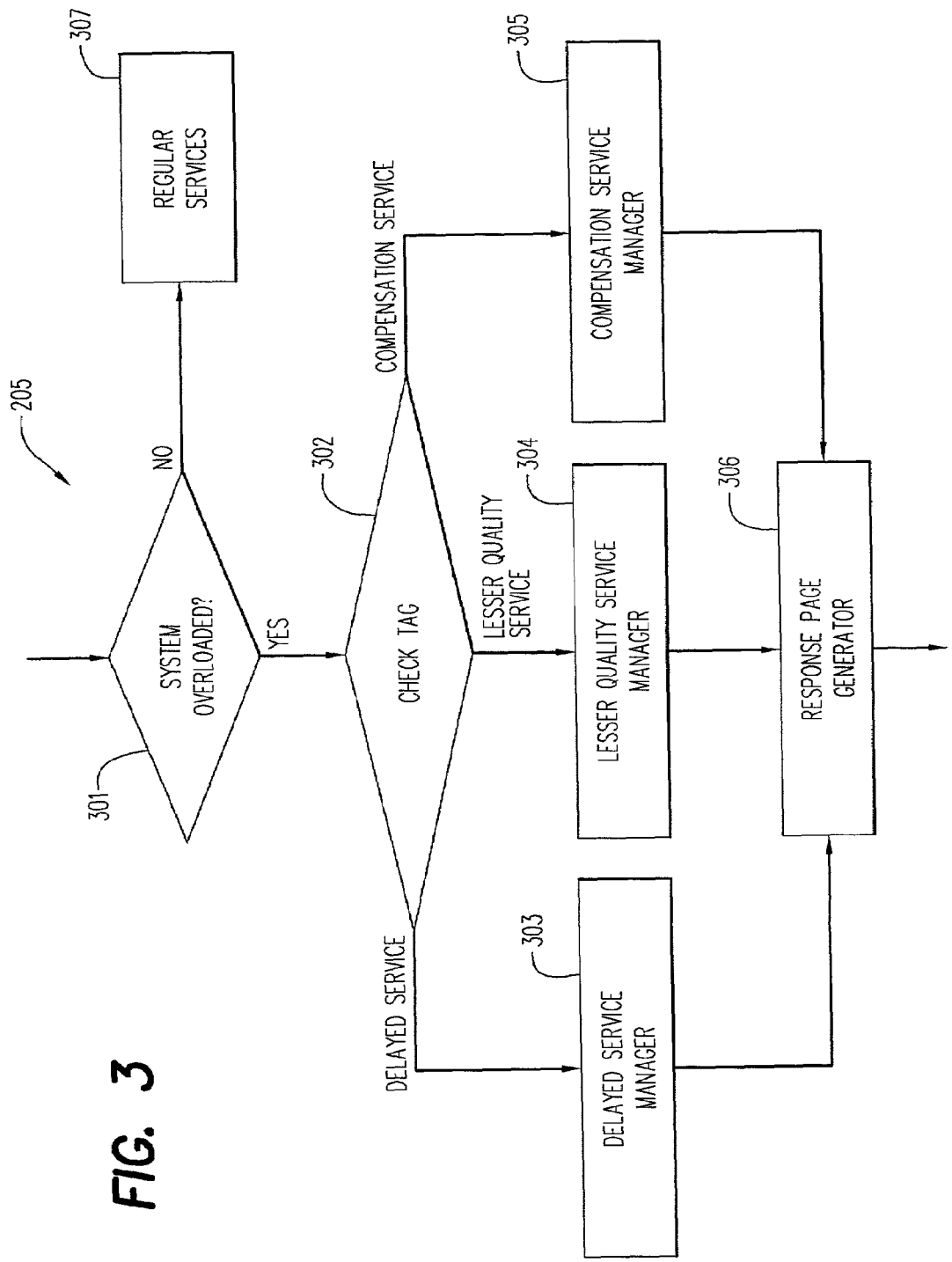
FIG. 3 is a flow chart diagram showing the operations of the gracefully degraded service manager in FIG. 2.

FIG. 3 is a flow chart diagram showing the operations of the gracefully degraded service manager 205. Here three alternative degraded services are shown as an example. Those skilled in the art will appreciate that there are other kinds of degraded services. In 301, the service manager first checks to determine if the system is overloaded. It needs to use the resource utilization data from the resource monitor 203 (in FIG. 2) and the SLAs database 207 (in FIG. 2). There is a set of resource usage statistics for each hosted content provider. System overload is checked against each content provider. If the system is not overloaded, regular services are provided 307. On the other hand, if the system usage for a particular content provider reaches an overloaded condition, then the tag identifier 202 (in FIG. 2) is used to examine the tag. This tag can be used to determine which kind of degraded services to offer. If a delayed service is needed, the service manager will call the delayed service manager 303 (more details in FIG. 4). If a lesser quality service is needed, the service manager will call the lesser quality service manager 304 (more details in FIG. 5). If a compensation service is needed, the service manager will call the compensation service manage 305 (more details in FIG. 6). Finally the response page generator 306 (more details in FIG. 7) will generate a response page which offers gracefully degraded service.

Figure 4:
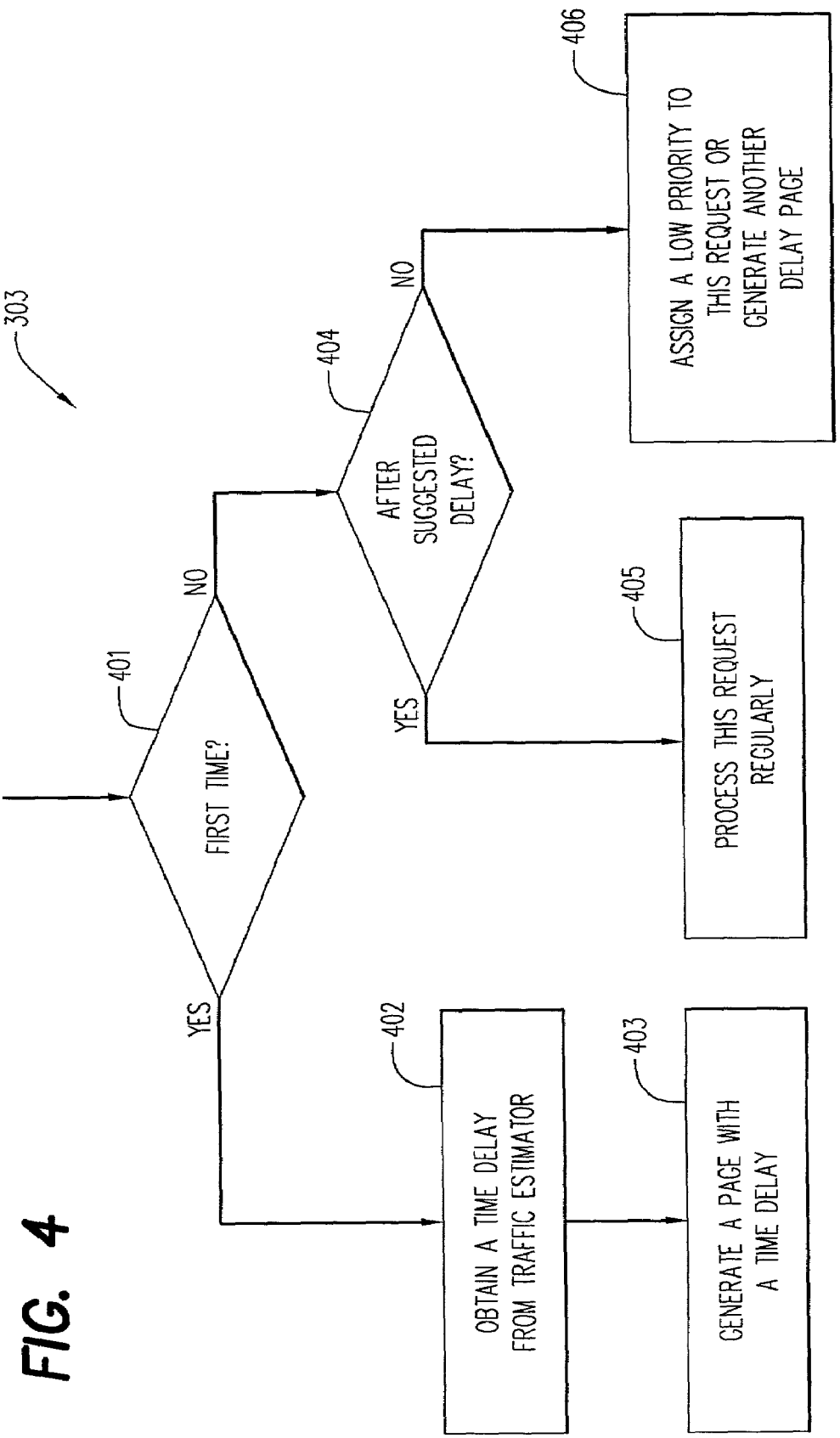
FIG. 4 is a flow chart diagram showing the operations of the delayed service manager in FIG. 3.

FIG. 4 is a flow chart diagram showing the operations of the delayed service manager 303 (in FIG. 3). First, the request is determined if it is a first time customer 401. This can be done by examining the tag. If yes, in 402, the delayed service manager obtains a time delay from the traffic estimator 204 (in FIG. 2). Then, in 403, it generates a page with such a time delay in it. For example, the page may contain a message such as "The servers are currently in high demands, please come back in 10 minutes." On the other hand, if the request is not a first time customer, then, in 404, the tag is checked to see if the customer has followed the suggested time delay to come back. If yes, in 405, the system will simply process this request regularly. If not, in 406, there are different options. The delayed service manager can simply assign a lower priority to this request and put it through the regular service process. Alternatively, it can generate another delay page.

It will have become evident that those skilled in the art will further appreciate that the estimation of a time delay need not be very accurate. In fact, with combination of delayed services and compensation (to be described in FIG. 6), the time delay can be made within a wide range, if needed. This way it is easier to spread the system load over a longer period of time. Besides, additional steps can be taken based on previously promised commitment. Additional compensation can be offered if the system load is still too high when a customer comes back as suggested.

Figure 5:
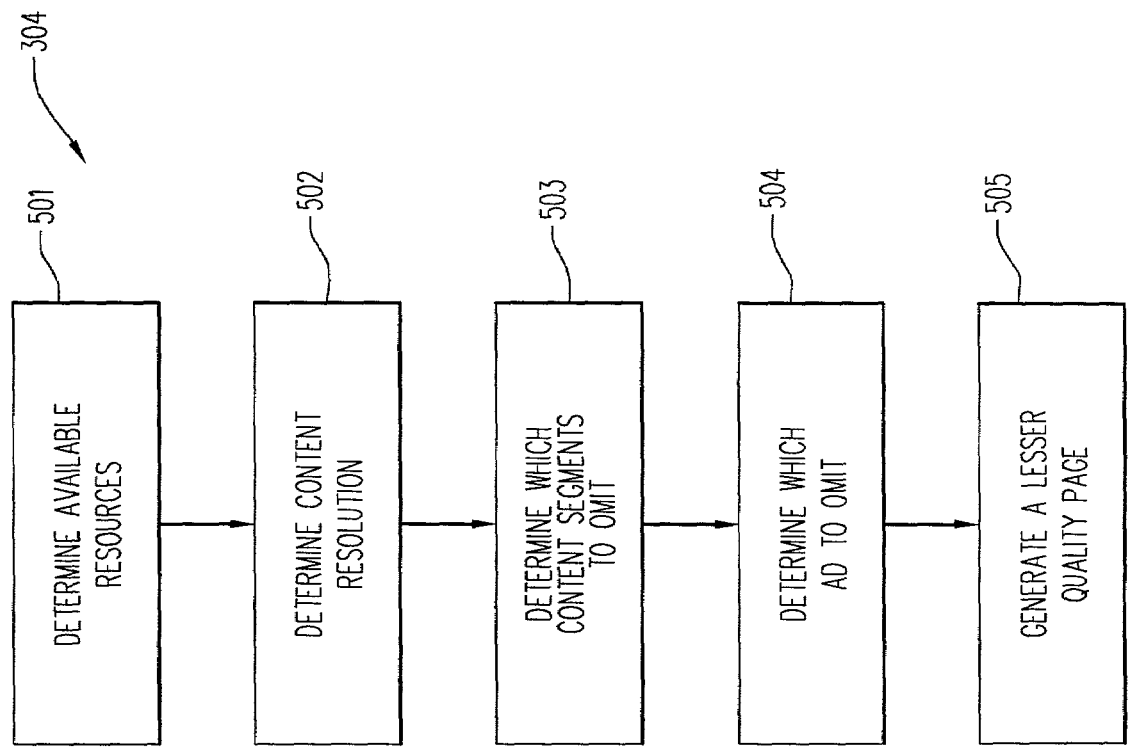
FIG. 5 is a flow chart diagram showing the operations of the lesser quality service manager in FIG. 3.

FIG. 5 is a flow chart diagram showing the operations of the lesser quality service manager 304 (in FIG. 3). In 501, it first determines available resources, such as the communication bandwidth. Then, in 502, it determines the proper content resolution based on the available resources. Those skilled in the art will appreciate that lesser quality contents 209 (in FIG. 2), such as image contents with coarser resolution, can be stored separately. These lesser quality contents can thus be offered during the times when bandwidth usage is high. Besides using coarser contents, some of the content segments or advertisement banners might be omitted totally. Thus, in 503, it determines which content segments, if any, to omit. In 504, it determines which ad banners, if any, to omit. Finally, in 505, it generate a lesser quality page.

Figure 6:
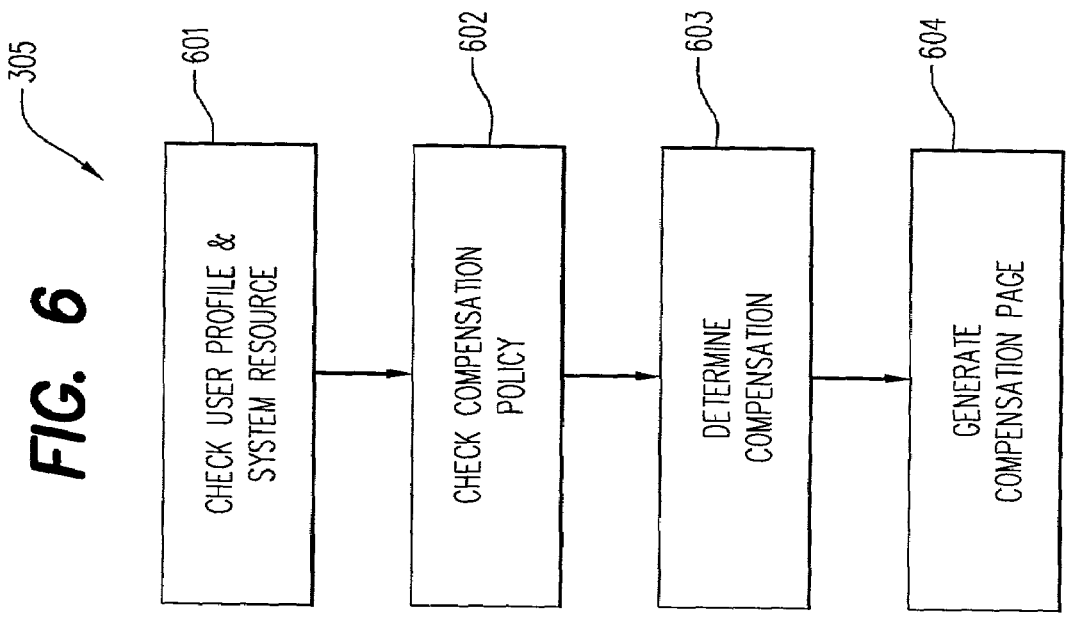
FIG. 6 is a flow chart diagram showing the operations of the compensation service manager in FIG. 3.

FIG. 6 is a flow chart diagram showing the operations of the compensation service manager 305 (in FIG. 3). In 601, the compensation service manager first checks user profile and system resource usage. Compensation can be in the form of upgrading future services or credit accumulation. In order not to arbitrarily compensate any request, special care must be taken to ensure that only the intended customers are compensated. Moreover, fraud detection mechanisms may be needed to prevent malicious requests from earning compensation by deliberately creating false requests. Thus, who should receive what compensation under what conditions must be specified. These specifications can be stored in the user profiler 206 (in FIG. 2) and compensation policies 208 (in FIG. 2) databases. Generally, the user profile information is controlled by the content providers. Hence, the content providers may have to share this information with the content hoster in implementing compensation services. In 602, the compensation policy is examined and then, in 603, the proper compensation is chosen. Finally, in 604, a page with compensation is generated.

Figure 7:
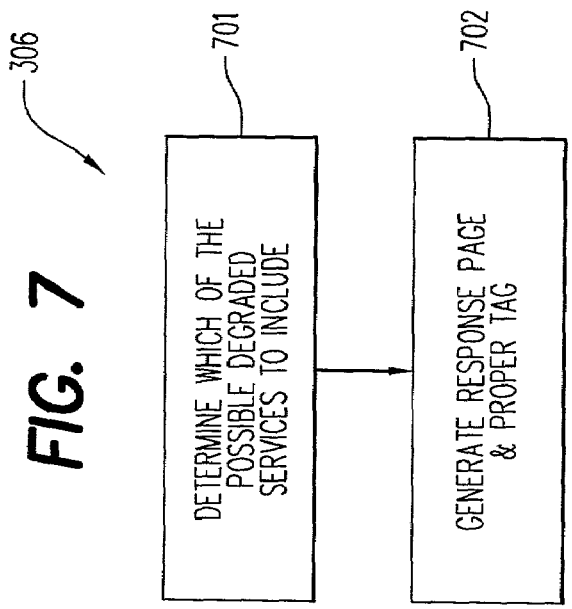
FIG. 7 is a flow chart diagram showing the operations of the response page generator in FIG. 3.

FIG. 7 is a flow chart diagram showing the operations of the response page generator 306 (in FIG. 3). In 701, the proper combination of services is determined. And in 702, the final response page is generated. The final gracefully degraded service can be a combination of various degraded services, such as the delayed services in FIG. 4, the lesser quality services in FIG. 5 and the compensation services in FIG. 6. For example, a delayed service can be combined with a compensation service. A lesser quality service can be combined with a compensation service. A single compensation can be given for not given a service at the current moment. Finally, a combination of all three kinds of services can be offered, as well. Note that proper tag can be attached to the header of the final response page as a kind of "cookies". Such tag may indicate the types of degraded services being offered. And when the customer comes back, the tag can be returned in the request header as "cookies".

Those skilled in the art will appreciate that the level of degraded services can be dependent on the user profile. For example, if club memberships are used by the content providers to offer differentiated services, these club memberships can be used to determine the level of degraded services. A gold club member will receive a lesser degraded service than a silver club or a bronze club member. The amount of delay, the level of content resolution and the amount of compensation can be dependent on the club membership. For example, a delayed service can be offered with the promise that the user will be upgraded to a higher membership class if he/she comes back as suggested.

Those skilled in the art will also appreciate that the gracefully degraded services disclosed in the present invention are preferably provided to the registered customers of a content provider, especially to those paid customers. Examples of such paid customers include buying customers in a B2C web site or business customers in a B2B web site. Paid customers are much more valuable than casual customers whose identities may not be known to the content providers. Furthermore, it is easier to prevent fraudulent activities engaged to obtain credits by maliciously generating traffic to a content provider Web site.

Those skilled in the art will appreciate that the response page must be given a higher priority and must be processed without much delay even during the times when the system are overloaded. In order to achieve this objective, extra emergency resources may need to be reserved. Fortunately, such emergency resources are generally available in most content hosters to handle future demand growth. These extra resources can be shared by all the content providers. In most cases, demand spikes do not occur simultaneously at all the content providers. Therefore, the content hoster only needs to reserve a relatively small amount of resources. With careful planning, these reserved resources can be productively used to provide gracefully degraded services to all the content providers. As a result, the content hoster can generate substantial returns on investments because of uncorrelated peak arrivals at the hosted content providers.

Those skilled in the art will also appreciate that the level of degraded services can be dependent on the level of system resource utilization. The extent of degradation in services can be less severe if the system is 80% utilized than if it is 90% utilized. Also, the level of degradation can be dependent on the currently available spare resources. If the content hoster still has lots of extra resources, a less degraded service can be offered.

Those skilled in the art will also appreciate that gracefully degraded services can be offered by the content hoster to smooth the service transition during which new resources are being added. Because user demands are difficult to predict, proper capacity planning is almost impossible to do in advance. Thus, the content hoster may have to frequently add new resource to service the customers of a content provider with growing customer demands. The gracefully degraded services disclosed in the present invention can be used to provide a smoother transition.

The invention having been thus described with particular reference tot he preferred forms thereof, it will be obvious that various changes and modifications may be made therein without departing from the spirit and scope of the invention as defined in the appended claims.

The invention claimed is:

1. A method for providing gracefully degraded services on the Internet under overloaded conditions, comprising the steps of
   a) tagging user requests to indicate the status of said requests, and
   b) providing appropriate level of degraded services gracefully responsive to said tagging information;
wherein the said step of tagging user requests is implemented through "cookies", where "cookies" are messages carried in the header of HTTP user requests.

2. The method of claim 1 wherein said level of gracefully degraded services is based on user profile information.

3. The method of claim 1 wherein said level of gracefully degraded services is based on the degree of resource utilization.

4. The method of claim 1 wherein said level of gracefully degraded services is based on previously promised commitment to said user.

5. The method of claim 1 wherein said degraded services is in the form of delayed services.

6. The method of claim 5, further comprising the steps of:
   a) determining if the request is a first time request;
   b) if not a first time request, determining if the request arrives as previously suggested.

7. The method of claim 5, wherein delayed services further comprises examining a user profile.

8. The method of claim 5, wherein delayed services further comprises examining previously promised services.

9. The method of claim 1 wherein said degraded services is in the form of lessor quality services.

10. The method of claim 1 wherein said degraded services includes a compensation.

11. The method of claim 1 wherein said degraded services is a combination of delayed service, a lesser quality content and compensation.

12. The method of claim 1 wherein said level of gracefully degraded services can be further based on club membership specified in the user profile.

13. A system for providing gracefully degraded services under overloaded conditions, comprising:
   (a) means for tagging user requests to indicate the status of said requests; and
   (b) means for providing an appropriate level of degraded services gracefully responsive to said tagging information;
wherein tagging user requests is implemented through "cookies", where "cookies" are messages carried in the header of HTTP user requests.

14. A memory medium for a system comprising:
   means for controlling the system operation to perform the following steps:
      (a) tagging user requests to indicate the status of said requests; and
      (b) providing appropriate level of degraded services gracefully responsive to said tagging information;
wherein tagging user requests is implemented through "cookies", where "cookies" are messages carried in the header of HTTP user requests.

15. A signal bearing medium tangibly embodying a program of machine-readable instructions executable by a digital processing apparatus to perform operations to gracefully degrade services on the Internet, the operations comprising:
   in response to receiving a first user request under conditions of existing or impending overload, appending a status tag to a response page sent to the sender of the first user request;

in response to receiving a second user request from the sender, determining an appropriate level of services from a status tag of the second user request; and providing a level of degraded services for the second user request gracefully responsive to said status tag of said second user request;

wherein the status tag of the second user request comprises at least one "cookie" message carried in a header of the second user request, which is an HTTP request.

* * * * *